United States Patent [19]
Gauthier

[11] Patent Number: 5,937,153
[45] Date of Patent: *Aug. 10, 1999

[54] METHOD OF UTILIZING VARIABLE DATA FIELDS WITH A PAGE DESCRIPTION LANGUAGE

[75] Inventor: Forrest P. Gauthier, Maineville, Ohio

[73] Assignee: Varis Corporation, Mason, Ohio

[ * ] Notice: This patent is subject to a terminal disclaimer.

[21] Appl. No.: 08/896,899

[22] Filed: Jul. 18, 1997

Related U.S. Application Data

[63] Continuation-in-part of application No. 08/373,582, Jan. 18, 1995, Pat. No. 5,729,665.

[51] Int. Cl.⁶ .................................................. G06F 15/00
[52] U.S. Cl. ......................... 395/117; 395/112; 395/106; 395/109
[58] Field of Search ................................... 395/117, 106, 395/109, 112

[56] References Cited

U.S. PATENT DOCUMENTS

| | | | |
|---|---|---|---|
| 5,103,490 | 4/1992 | McMillin | 382/62 |
| 5,134,669 | 7/1992 | Keogh et al. | 382/61 |
| 5,157,765 | 10/1992 | Birk et al. | 395/163 |
| 5,202,206 | 4/1993 | Tam | 430/41 |
| 5,291,243 | 3/1994 | Heckman et al. | 355/201 |
| 5,459,819 | 10/1995 | Watkins et al. | 395/117 |
| 5,459,826 | 10/1995 | Archibald | 395/147 |
| 5,506,697 | 4/1996 | Li et al. | 358/448 |
| 5,729,665 | 3/1998 | Gauthier | 395/117 |

*Primary Examiner*—David K. Moore
*Assistant Examiner*—Lance W. Sealey
*Attorney, Agent, or Firm*—Thompson Hine & Flory LLP

[57] ABSTRACT

A method for printing variable data with page description language, which enables the graphics states for a static page to be defined and stored; and which enables the stored graphics states to be associated with items of variable data from a database, so that once defined, the graphics states can be used to print multiple pages of variable data. The method of the present invention is implemented by means of a control task, which executes in a printer in conjunction with a page description program, to identify data areas in the program, and store the graphics states for the data areas as they are defined by the program. A merge task associates items of variable data from a data file with the graphics states, generates a bit map for each variable data area, merges the bit maps with the page template, and outputs the page from the printer. Accordingly, in the method of the present invention, bit maps for multiple pages of variable data are generated from a single page description program.

6 Claims, 2 Drawing Sheets

METHOD OF UTILIZING VARIABLE DATA FIELDS WITH A PAGE DESCRIPTION LANGUAGE

CROSS-REFERENCE TO RELATED APPLICATIONS

This is a continuation-in-part of U.S. application Ser. No. 08/373,582, filed Jan. 18, 1995 now U.S. Pat. No. 5,729,665.

BACKGROUND OF THE INVENTION

The present invention relates to the high-speed printing industry, and more particularly, to a method for printing variable data using a page description language in a high-speed printing environment.

Application programs, such as Adobe Illustrator®, typically include a program which generates a specification of a screen or page's contents in a page description language. The specification, or page description code, provides instructions as to how to generate the image in a printer. The page description code is transferred from the application program to a printer, where it is executed to generate a bit map of the page. The most commonly used page description language is PostScript®, which is a machine independent language produced by Adobe Systems, Inc.

An application program page typically contains a number of data areas with either graphic or alphanumeric data. The PostScript language includes commands that define or build "graphics states" for each of the data areas on the page. These graphics states are sets of default attributes such as angle, scale factor, type-font, location, etc., which define how data is to appear on the page. Often, multiple graphics states are defined for a single page, with the different graphic states corresponding to different data areas on the page. Examples of commands that are used in PostScript to build a graphics state are: 20 rotate, /Times-Roman findfont, 14 scalefont, and setfont. In addition to commands which build graphics states, PostScript specifications also include the graphic or alphanumeric data which is displayed in the data areas, as well as a print command such as "SHOW", which causes a bit map to be generated for the data.

In the past, page description languages, including PostScript, have only been used to print static data pages, because page description languages lack the functionality required for variable data printing. In variable data printing, each page shares a common background, and the displayed data in at least one data field changes for each page. Up until now, it has not been possible to print pages of variable data with page description languages such as PostScript, because the page description languages are unable to save page backgrounds and graphics states from a page specification, and are thus unable reuse the same background and graphics states when printing subsequent pages. Thus, with page description languages such as PostScript, whether the entire page is changed, or only a single item of data on the page is changed, a new page description language specification is generated to print each separate page.

For example, if thousands of copies of a mass mailing advertisement were to be printed, each copy being identical except for the recipient's name and address, it would be necessary to generate a new PostScript specification defining the page background, and the graphics states for the name and address fields, for each new name and address that is printed. Hence, to print 50 advertisements, it would be necessary to generate 50 PostScript specifications which each define virtually the same image.

In general, PostScript specifications are very complex and require extensive processing to generate and execute. Thus, generating a new PostScript specification each time a page of variable data is printed consumes an immense amount of processing time. In high-speed printing systems, it is typically the processing time, not the printer hardware, which determines the speed at which pages can be printed. Therefore, the processing required to repetitively redefine the same background and graphics states for each page of variable data significantly slows the entire printing system.

Due to the amount of processing time consumed in redefining the page template and graphics states for each new page of data that is printed, as well as the resultant effect on printing speed, it is desirable to have a method for processing variable data wherein once defined, the template and graphics states for a page can be stored and reused for printing subsequent pages. Further, it is desirable to have a method for printing variable data which is compatible with existing printing systems and page description languages, such as PostScript, and which is capable of processing variable data in a high-speed industrial printing system.

SUMMARY OF THE INVENTION

It is an object of the present invention to provide a method for utilizing variable data with a page description language, which enables the template and graphics states for a page of variable data to be defined and stored; and which enables the stored graphics states to be associated with multiple items of variable data from a database or merge file; so that once stored, the graphics states can be repeatedly applied to the items of variable data to print multiple pages of variable data or multiple variable data bitmaps. Further, it is an object of the present invention to provide such a method which is compatible with existing page description languages, and which can be used in a high-speed industrial printing system.

The method of the present invention is implemented by means of a control task which executes in conjunction with a page description code interpretive program, such as a PostScript program, to identify variable data areas in the page description code specification, and reserve the graphics states for the variable data areas as they are defined by the specification. After the interpreter program has executed, a merge task is initiated. The merge task associates items of variable data from a data file with the reserved graphics states, generates a bit map for each variable data area, merges the bit maps with the page template, and outputs a complete bit map for the page. Accordingly, in the method of the present invention, bit maps for multiple pages of variable data are generated from a single page description language specification.

The present invention assumes the generation of a page specification in PostScript, or another similar page description language, by the application program, and the transfer of this specification to a printer. According to the present invention, a control task activates and monitors the PostScript interpreter program in the printer. As the interpreter executes, it defines graphics states for the data areas on the page. The PostScript attributes for a graphics state are stored in a stack as they are defined, so that at any given point in the code, the stack represents all of the PostScript attributes for the current graphics state.

When the control task identifies a print command in the code, the control task interrupts the interpreter to determine whether the data to be printed is variable data. If the data is variable, the current graphics state, consisting of the attributes then existing in the stack and job specific attributes which are defined in a job file, is linked to the data area and reserved in an internal database. Further, character bit maps are generated in accordance with the graphics state, and linked to and reserved with the graphics state. After the graphics state and character bit maps have been reserved, the PostScript interpreter is resumed at the line of code following the print command.

The interpreter continues executing until either the control task detects another print command, or the last line of code is reached. If a second print command is detected, the interpreter is interrupted again and the above steps repeated, to reserve the stack contents and job attributes for the second data area, and to generate and store a second set of character bit maps. The control task continues in this manner monitoring and interrupting the interpreter program, until all of the variable data areas on the page have been detected, and graphics states and possibly character bit maps for the variable data areas have been reserved in the database.

As the PostScript interpreter executes, a bit map of the non-variable background graphics and text, otherwise referred to as a "template", is generated for the page. At the last code command, which in PostScript is typically "SHOWPAGE," the control task terminates the PostScript interpreter, and reserves the template in the database.

The merge task is then initiated to print variable data pages using the reserved page template, graphics states and character bit maps. The merge task begins by retrieving a merge file containing the variable data to be printed. After retrieving the merge file, the task identifies the correct template for the current page, and the names of the graphics states related to that template, from data in the merge file. Then, using the name of the first graphics state reserved for the template, the merge task retrieves the graphics state from the database and the character bit maps linked to that state. The merge task then retrieves data corresponding to that graphics state from the appropriate field in the merge file, and generates a bit map of the data in accordance with the graphics state and character bit maps. The merge task then merges the data bit map into the template. After the bit map has been generated and merged, the merge task identifies retrieves another graphics state for the template and repeats the process. If there are no more graphics states which correspond to variable data areas on the page, the merge task outputs the finished bit map for the page.

After the first page of data has been printed, the merge task retrieves a "clean" template from the database, and again identifies the graphics states for the page. The merge task then retrieves the next record of variable data from the database, and generates variable data bit maps for each of the fields in the record, in accordance with the reserved graphics states and character bit maps which correspond to each of the fields. The merge task continues in this manner, identifying variable data areas and generating bit maps for the variable data in the merge file, until a page has been printed for each variable data record in the file.

The method of the present invention is advantageous in that once the graphics states and template have been defined for a variable data page, they can be reused to print multiple pages of variable data with only a minimal amount of additional processing.

Accordingly, it is an object of the present invention to provide a method for printing variable data with a page description language; a method which increases the speed at which variable data pages can be printed; a method which enables the printing attributes for a page to be saved and used for printing multiple pages of data; and a method which is compatible with existing page description languages and printing systems.

Other objects and advantages of the present invention will be apparent from the following description, the accompanying drawings and the appended claims.

DETAILED DESCRIPTION

The present invention provides a computer-implemented method for reserving graphics states, which enables a page description language to be used for variable data printing. In accordance with the present invention, graphics states describing variable data areas are generated by a page interpreter program and reserved in an internal database. The graphics states are later accessed from the database and used for printing variable data pages. The method of the present invention can be employed with a conventional page description language, such as Postscript, to enable variable data pages to be printed with a minimum amount of processing.

Figure 1:
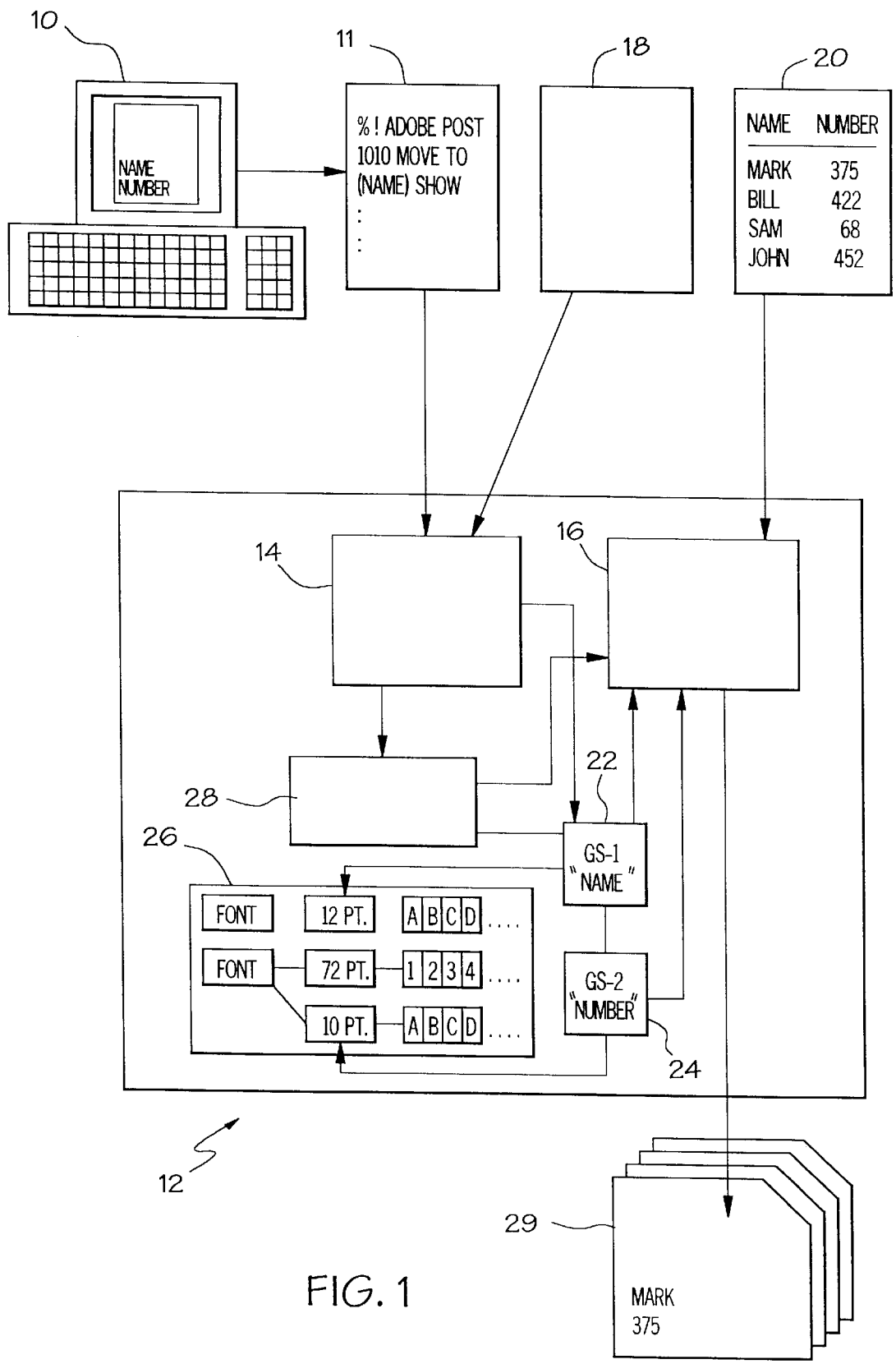
FIG. 1 is a data flow diagram illustrating the preferred embodiment of the method of the present invention.

As shown in FIG. 1, an image containing text and/or graphics data is created at a workstation 10, using a graphics application program such as Adobe Illustrator®. As the image is created, the application program displays the image on the workstation screen. When the image is complete and ready to be printed as a page, the application program generates a specification of the image in PostScript in a conventional manner.

After the Postscript file 11 is generated, it is transferred from the workstation 10 to a printer generally designated as 12. In the printer 12, a PostScript interpreter 14 is executed to generate a pagemap of the image. In the method of the present invention, a control task operates in the printer 12 to initiate the PostScript interpreter program 14 and a merge task 16. The control task is initiated upon power-on of the printer 12, and controls and coordinates the variable data printing.

As the PostScript interpreter 14 executes, it defines the Postscript graphics state attributes for the page. These attributes can include the size, font, position, orientation, and location in which the graphic or text data is to appear on the page. The specifics of the attributes which are available in Postscript to define how data is to appear on a page would be well-known to one skilled in the art. Therefore, further description of these PostScript attributes is not provided.

However, one of the Postscript attributes, namely the region, has been expanded in the present invention to allow for variable data printing. In the method of the present invention, the region attribute is used to define the boundaries or extent to which a variable data graphics state will be allowed to effect a page. The graphics state extent is an invisible boundary which acts as a clippath for the page, to prevent variable data for a particular graphics state from extending outside the intended boundaries of the graphics state. The region of the graphics state extent is defined without altering Postscript, by using an ordinary shape, which is created as part of the image, to define the region. In the present invention, the artist creates a shape representing the extent as part of the page image, and specifies a particular trigger color or gray scale for the shape. Thus, the artist could include a medium gray scale rectangle in the upper left-hand corner of the page, with the boundaries of the rectangle representing the extent which the artist has defined for the graphics state positioned at that corner of the page. The medium gray scale will then represent the trigger color, and will be specified as the trigger for the region attribute in a job file 18 in the printer 12.

In addition, a second parameter in the job file 18 can be used to specify whether the rectangle should appear on the page, or whether it is being used only to define a graphics state extent. Thus, if the artist also wants the medium gray scale rectangle to appear on the printed page, this parameter enables the color to act as a trigger, yet not inhibit the artist's design. When the rectangle is interpreted during the method of this invention, the control task will detect the trigger color and will save an "invisible" boundary represented by the rectangular as part of the graphics state.

As the Postscript attributes are defined, they are placed in a stack. When a new attribute is defined, it is added to the top of the stack. When an attribute is deleted, it is removed from the stack. The combination of all of the attributes located in the stack at any point during the execution of the PostScript interpreter 14 constitutes the "current" graphics state for the page.

When the interpreter reaches a print command, such as "SHOW" in PostScript, the command triggers the control task to interrupt the interpreter program. During this interruption, the control task interprets data in the PostScript file 11 and reserves a graphics state if the data is variable. Normally in a PostScript file, data which is to appear on the printed document is enclosed within parentheses. Thus, the control task identifies data in the file 11 by locating parentheses in the code.

After the control task identifies the data, it interprets the data to determine whether it is static data, which is to be part of the page template, or variable data. To interpret the data, the control task first reads the data located in the parentheses and compares the data with a list of literal data strings stored in the job file 18. The job file 18 contains a list of data strings which are each associated with the name of a graphics state and its corresponding data field in a merge file 20. In the preferred embodiment, the graphics state name is the same as the field name in the merge file 20. The merge file 20 contains variable data arranged in records, with each record corresponding to a different page. Each record contains one or more data fields, which each correspond to separate variable data areas on the page. The list of data strings and associated graphics state names is entered in the job file 18 by the print operator prior to initiating the print job. If the data from the PostScript file 11 matches a data string in the job file 18, the control task replaces the data from the file 11 with the graphics state name associated with the matching data string. In this manner, the control task transforms static data in the PostScript file into a variable data field, by substituting a graphics state field name for the static data in the file.

In a second embodiment, the graphics state name corresponding to the data area is defined directly within the PostScript file 11, by making the name part of the image that is created in the application program. In this embodiment, the name is enclosed within brackets in the file, such as "<<>>", to enable the control task to identify the data as defining a graphics state rather than being an ordinary data string. Thus, to define the graphics state "ADDRESS" within the PostScript file 11, the following would appear before a show command in the code: "(<<ADDRESS>>)". This second embodiment is advantageous in that it does not require the control task to compare the file data with a data list in the job file 18; however, it does require coordinating the graphics state and field names between the merge file 20 and the application program.

If the control task determines that the data corresponds to a variable area, it reads the current contents of the graphics state stack to determine the attributes to be used for printing data in that area. In addition to the Postscript attributes specified in the stack, the graphics state can also include attributes which are specifically tailored to variable data printing. These additional attributes can either appear after the graphics state name inside a "show" command, if the graphics state is defined directly in the PostScript file, or can be specified in the job file 18 prior to execution of the print job. These additional attributes specify how the variable data is to be positioned within the graphics state. The following is a list of the variable data attributes which can be specified for a print job:

Name:
   A label used to identify the data to which the graphics state applies. A single datum may be inserted into more than one graphics state so this attribute is not unique to a single state.

Glyphs:
   A list of character glyphs, both attributes and images, which are available for use in the graphics state. (e.g. an alphabet of 72 point Times-Roman bold italic characters).

Static Data:
   Data to be used in the event that variable data is not available.

Identification:
   A number used to uniquely identify a graphics state.

Justification:
   How to handle the text left to right—left border, right border, centered or justified.

Alignment:
   How to place the text vertically in the graphics state. This could be top, bottom or centered.

Word Wrapping:
   Selects a word wrapping algorithm.

Dynamic Registration:
   Information on how to determine the registration from one page to the next.

Logic Mode:
   The manner in which the bitmap merge takes place. This is one of seven binary combination techniques.

DP Procedure:
   A procedure (or program) used to manipulate the variable data just before the graphics state is applied.

Data Selection:
   Which portions of the variable data to use.

Underline:
   Selects underlined text.

When the control task is triggered to reserve a graphics state, the above listed attributes, if specified, are combined with the Postscript attributes from the stack, and reserved as a single graphics state under the name obtained from the PostScript file 11 or the job file 18 such as shown at 22.

After the control task has compiled the attributes for the current graphics state, it may instruct PostScript to generate a font cache 26 for the graphics state. The font cache 26 consists of a character bit map for each of the alphanumeric characters A–Z and 0–9 generated in the font specified in the graphics state. After PostScript has generated all of the character bit maps, and placed the bit maps in the font cache 26, the font cache is linked to the graphics state 22, and reserved in the database. After the control task has reserved the current graphics state 22 and the font cache 26 in the database, it resumes execution of the PostScript interpreter 14 at the first line of code after the print or "SHOW" command, so that the print command is not executed.

After the interpreter is resumed, it continues defining graphics state attributes for the page, until the control task detects another print or "SHOW" command. Upon detecting another print command, the control task again interrupts execution of the interpreter, and determines whether the data in the PostScript file 11 corresponds to a variable data area. If the data corresponds to a variable data area, the control task again substitutes a graphics state name from the job file 18 for the data in the PostScript file 11, and reads the graphics state attributes from the stack and job file. The control task also instructs PostScript to generate another font cache, if the attributes of the current graphics state differ from the attributes of previously reserved graphics states. The current graphics state and font cache are then linked, and reserved in the database under the second graphics state name from the job file 18, such as shown at 24. If the data does not correspond to a variable data area, the control task resumes execution of the interpreter at the print command, so that a bit map for the data can be generated and added to the template.

At the final line of code, the template is complete, and incorporates all of the static text and graphic data that is to appear on the printed document. At this point, the control task terminates the interpreter, and saves the template to the database such as shown at 28. In PostScript, the control task is triggered to save the template by the "SHOWPAGE" command.

Since the control task of the invention operates externally of the Postscript interpreter, the method of the present invention enables bit maps and graphics states to be generated by the interpreter in a conventional manner. However, rather than printing a completed page map at the end of the interpreter program, the method of this invention reserves the page maps, character bit maps and graphics states generated by the interpreter, in order that they may be subsequently accessed and used to print multiple pages of variable data.

After the interpreter has been terminated, the control task initiates the merge task 16. The merge task 16 interfaces between the merge file 20, which has been pre-programmed with items of variable data, and the database in which the templates, font caches and graphics states defined by the interpreter have been saved, in order to combine the variable data with a template on a single page map. The merge task 16 begins by accessing the merge file 20 to retrieve the name of the template for the page, and then retrieving the specified template from the database. In addition, the merge task 16 retrieves the names of the data fields and reserved graphics states which are associated with the selected template from the merge file 20.

Using the name corresponding to the first graphics state on the page, the merge task 16 accesses the merge file 20 and retrieves the data stored under that field name in the first data record. In the representative merge file 20 shown in FIG. 1, the field names are NAME and NUMBER.

After the merge task 16 has read the data corresponding to the designated field name, it retrieves the graphics state which was reserved under the same name, as well as the character bit maps which are linked to that graphics state. The merge task 16 then generates a bit map of the data in accordance with the graphics state attributes. After the bit map is generated, it is merged into the template at the region corresponding to the graphics state, by writing the data bit map over the existing template bit map.

It will be apparent to those of ordinary skill in the art that it is within the scope of the invention to write the data bit map over a clean page as opposed to the template bitmap. For example, if the template contains no static bitmap data, then it would not be necessary to save an empty bitmap of the template in the database as described above. Thus, it is within the scope of the invention that the PostScript file 11 defines only variable data areas and does not define any static data areas. Such a PostScript file is illustrated in FIG. 1.

After the data from the first field has been merged into the template, the merge task 16 reads the name corresponding to a second variable data area from the merge file 20, if a second variable area exists on the page. The merge task 16 then retrieves the graphics state and linked font cache having the same name as the second variable area. Next, using this name, the merge task 16 again accesses the merge file 20, and reads the data from the field of the same name. The merge task 16 then generates a bit map for the data in accordance with the graphics state and font cache, and again merges the data bit map into the template 28.

The merge task 16 continues the steps of identifying variable data areas for the template, retrieving graphics states and character bit maps corresponding to the variable areas, accessing variable data from the merge file 20, and generating bit maps for the variable data, until bit maps have been generated and merged for all of the variable data to be included on the page. When a bit map has been generated for each variable data area, and merged with the template 28, the pagemap is output for printing as shown at 29.

The merge task 16 then proceeds with printing a second page using the same template and graphics states, but a different variable data record in the merge file 20. To print the second page, the merge task 16 retrieves a "clean" template from the database. Next, the merge task 16 again identifies the name of the first variable data area for that template and retrieves the graphics state of the same name. Then, the merge task 16 reads the data for that field from the second record of the merge file 20, and generates a bit map of the data using the retrieved graphics state attributes and character bit maps. Once the bit map is generated, the merge task 16 merges the bit map into the template by writing the bit map over the template at the location defined by the graphics state.

The merge task 16 then continues processing in this manner until bit maps have been generated and merged into the template for all of the graphics states reserved for the page. After all of the bit maps for the second page have been merged into the template, the page is printed. The merge task 16 continues, repeating these steps for each record of data in the merge file 20, until all of the variable data records have been printed on a page.

Figure 2:
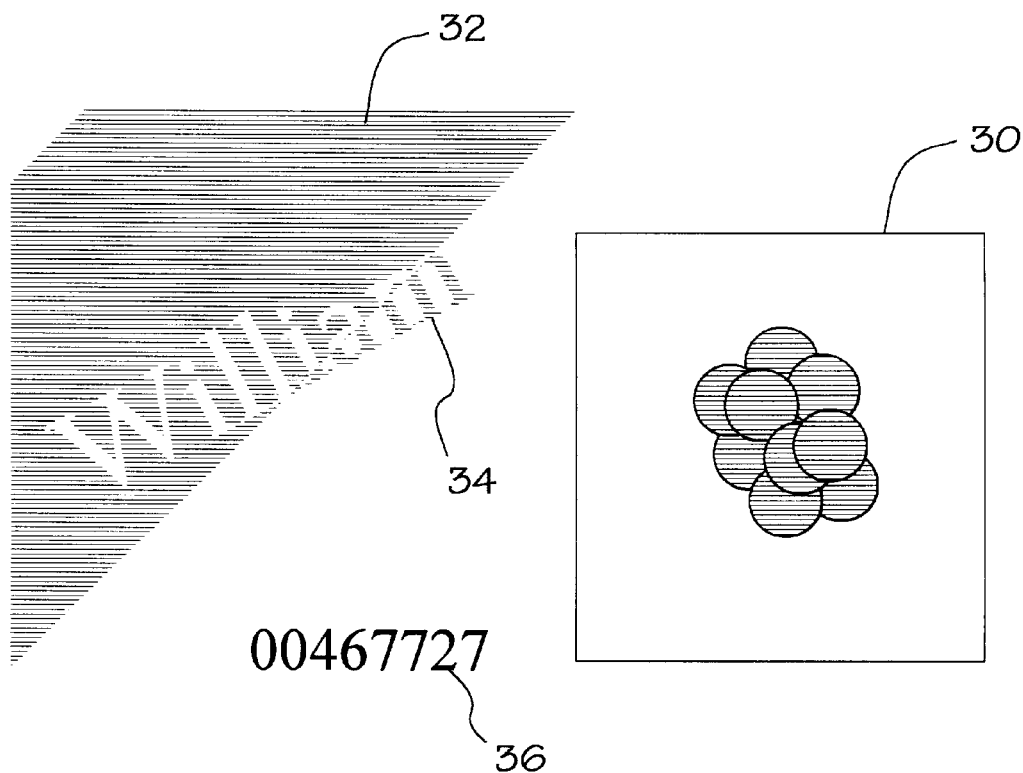
FIG. 2 is an example of a variable data page generated in accordance with the method of the present invention.

FIG. 2 shows a variable data page printed in accordance with the method of this invention. On this page, the data fields 30 and 32 are static fields which are part of the page template. The data field 34 containing the name "William" is a variable data field. Different names such as Mark or Sam, from the merge file 20, are printed in this field on subsequent pages. The font, angle and color contrast in which "William" is displayed are all aspects of the graphics state which were defined and stored during the steps of the present invention. Data field 36 which contains the number "00467727" is a second variable data area on the page. Again, the data displayed in this area varies on each page, depending upon the contents of the merge file 20.

While the method described constitutes a preferred embodiment of the invention, it is to be understood that the present invention is not limited to this precise form, and that variations may be made without departing from the scope of the invention.

What is claimed is:

1. A computer implemented method for generating a plurality of bit maps suitable for high-speed printing comprising the steps of:

(a) generating a page description code specification, the page description code specification defining at least one data area to become variable, and the page description code further defining a graphics state corresponding to the data area, the graphics state including at least one attribute which controls the appearance of data in the data area;

(b) interpreting the page description code specification, and during the interpretation, identifying the data area defined by the page description code specification;

(c) storing the graphics state corresponding to the data area upon the identification of the variable data area in step (b);

(d) retrieving a variable data item from a plurality of variable data items;

(e) applying the stored graphics state to the variable data item to generate a variable data bit map; and (f) repeating steps (d) and (e) for remaining variable data items in the plurality of variable data items, whereby the stored graphics state is applied repeatedly to generate a plurality of variable data bit maps.

2. The computer implemented method of claim 1, further comprising the steps of:

generating a set of character bit maps according to the graphics state corresponding to the data area; and linking the set of character bit maps to the graphics state corresponding to the data area.

3. The computer implemented method of claim 1, wherein the page description code specification represents a template and includes a static data area; and the computer implemented method further comprises the steps of:

executing portions of the page description code specification corresponding to the static data area to generate a template bit map;

storing the template bit map; and merging each of the plurality of the variable data bit maps into a clean copy of the template bit map to create a plurality of merged bit maps.

4. The computer implemented method of claim 1, wherein the identifying step includes the step of detecting predefined characters within a text string defined in the page description code specification.

5. The computer implemented method of claim 1, wherein the attribute is a size attribute, a font attribute, a position attribute, an orientation attribute or a location attribute.

6. A computer implemented method for processing a page description code specification comprising the steps of:

interpreting the page description code specification, and during the interpretation, identifying a data area defined by the page description code specification;

upon the identification of the data area, storing a graphics state set forth in the page description code specification which defines an attribute of how data is to appear in the data area; and repeatedly retrieving data records from a plurality of data records and applying the stored graphics state to the data records to generate a plurality of bit maps of the data records so that the bitmaps of the data records include the attribute.

* * * * *